United States Patent [19]
Edler

[11] Patent Number: 6,007,789
[45] Date of Patent: Dec. 28, 1999

[54] METHOD OF NITRIDING SILICON

[75] Inventor: James P. Edler, Troy, Mich.

[73] Assignee: Eaton Corporation, Cleveland, Ohio

[21] Appl. No.: 08/270,613

[22] Filed: Jul. 5, 1994

Related U.S. Application Data

[63] Continuation-in-part of application No. 07/972,070, Nov. 3, 1992, Pat. No. 5,344,634.

[51] Int. Cl.$^6$ ............ C01B 21/068; C01B 21/06
[52] U.S. Cl. ............ 423/344; 423/406; 264/659
[58] Field of Search .................. 423/344, 406; 501/97; 264/65, 659; 437/242, 241

[56] References Cited

U.S. PATENT DOCUMENTS

| | | |
|---|---|---|
| 2,268,589 | 1/1942 | Henny . |
| 2,869,215 | 1/1959 | Smith . |
| 3,205,080 | 9/1965 | Ryshkewitch . |
| 3,222,438 | 12/1965 | Parr et al. . |
| 3,669,723 | 6/1972 | Parr et al. . |
| 3,778,231 | 12/1973 | Taylor . |
| 3,819,786 | 6/1974 | May . |
| 3,887,412 | 6/1975 | Styhr et al. . |
| 3,937,792 | 2/1976 | Lumby . |
| 3,950,464 | 4/1976 | Masaki . |
| 3,991,166 | 11/1976 | Jack et al. . |
| 3,992,497 | 11/1976 | Terwilliger et al. . |
| 4,033,400 | 7/1977 | Gurwell et al. . |
| 4,036,653 | 7/1977 | Jacobson . |
| 4,067,943 | 1/1978 | Ezis et al. . |
| 4,119,689 | 10/1978 | Prochazka et al. . |
| 4,164,528 | 8/1979 | Yajima et al. . |
| 4,235,857 | 11/1980 | Mangels . |
| 4,285,895 | 8/1981 | Mangels et al. . |
| 4,354,990 | 10/1982 | Martinengo et al. . |
| 4,356,136 | 10/1982 | Mangels . |
| 4,376,742 | 3/1983 | Mah . |
| 4,377,542 | 3/1983 | Mangels et al. . |
| 4,410,636 | 10/1983 | Minjolle et al. . |
| 4,443,394 | 4/1984 | Ezis . |
| 4,471,060 | 9/1984 | Dickie et al. . |
| 4,519,967 | 5/1985 | Crosbie et al. . |
| 4,530,825 | 7/1985 | Johansson . |
| 4,576,923 | 3/1986 | Broussaud et al. . |
| 4,781,874 | 11/1988 | Edler . |
| 4,832,888 | 5/1989 | Sato et al. . |
| 4,943,401 | 7/1990 | Edler et al. . |
| 4,970,057 | 11/1990 | Wilkens et al. . |
| 5,156,830 | 10/1992 | Edler . |
| 5,160,719 | 11/1992 | Edler . |
| 5,344,634 | 9/1994 | Edler . |

FOREIGN PATENT DOCUMENTS

| | | |
|---|---|---|
| 076549 | 6/1977 | Japan . |
| 081250 | 5/1983 | Japan . |
| 60-42209 | 6/1985 | Japan . |
| 779474 | 7/1955 | United Kingdom . |

OTHER PUBLICATIONS

Sacks, et al., Properties of Silicon Suspensions and Slip–Cast Bodies, 1985, 1109–1123.

Jahn, Processing of Reaction Bonded Silicon Nitride, 1989, 1–24.

Williams, et al., Slip Casting of Silicon Shapes and Their Nitriding, 1983, p. 607–619.

Mangels, Effect of Rate–Controlled Nitriding and Nitriding Atmospheres on the Formation of Reaction–Bonded $Si_3N_4$, 1981, p. 613–617.

Moulson et al., Nitridation of High–Purity Silicon, 1975, p. 285–289.

Shaw et al., Thermodynamics of Silicon Nitridation: Effect of Hydrogen, 1982, p. 180–181.

Moulson, Reaction–bonded Silicon Nitride: its Formation and Properties, 1979, p. 1017–1051.

Atkinson, et al., "Nitridation of High Purity Silicon", J. Am. Ceramic Society, vol. 59, No. 7–8, p. 285–289, 1976.

Moulson, et al., "Removal of Surface Silica and the Effect Upon Silicon Nitridation Kinetics", J. Mat. Sci., vol. 16 (1981) p. 2319–2321.

*Primary Examiner*—George R. Fourson
*Attorney, Agent, or Firm*—Loren Uthoff, Jr.; Lynn E. Cargill; Susan M. Cornwall

[57] ABSTRACT

A process for nitriding materials containing silicon to form a silicon nitride material predominantly in the alpha phase is disclosed which includes nitriding the silicon-containing material by (a) heating the silicon-containing material in an atmosphere containing at least hydrogen in the temperature range of about 0° C. to about 800° C. and (b) thereafter, nitriding the silicon-containing material by subjecting the silicon-containing material to a nitriding atmosphere containing at least nitrogen gas in the temperature range of from about 1000° C. to about 1450° C. to effect nitriding.

14 Claims, No Drawings

METHOD OF NITRIDING SILICON

This is a continuation-in-part of application Ser. No. 07/972,070 filed on Nov. 3, 1992, now U.S. Pat. No. 5,344,634.

TECHNICAL FIELD

This invention relates generally to a method of a nitriding silicon.

BACKGROUND OF THE INVENTION

Silicon nitride has been a material of interest for many years due to its high temperature strength, creep resistance and low thermal expansion, as well as its extremely efficient resistance to corrosion and its ability to make critically engineered parts.

Generally, the practice of nitriding silicon-containing material has been investigated for many years, and has resulted in a process which takes a very long time, so long in fact that the process is not commercially feasible. It would be advantageous to practice a method for nitriding the silicon-containing material to produce silicon nitride in a manner which takes less time than current methods therefore. It would also be advantageous to have a method of enhancing the nitridation of silicon so that a more complete conversion to silicon nitride may be achieved.

Generally, it has been the practice to form silicon nitride parts by "reaction bonding" or by "hot pressing" or by a pressureless sintering process. Reaction bonding comprises compacting silicon powder of commonly less than 400 mesh into the part commonly at ambient temperature and then exposing the part to molecular nitrogen at about 1400° C. for a period of time sufficient to convert the silicon to silicon nitride such as disclosed in U.S. Pat. No. 4,235,857, the disclosure of which is incorporated herein by reference. Such is also reviewed by A. J. Moulson in an article titled "Review Reaction-Bonded Silicon Nitride: Its Formation and Properties," Journal-Materials Science, 14, (1979) 1017–1051 and by Mangels in an article titled "Effect of Rate-Controlled Nitriding and Nitriding Atmospheres on the Formation of Reaction-Bonded $Si_3N_4$", Ceramic Bulletin, Volume 60, No. 6 (1981), 613 in which he also describes benefits derived by using a nitriding gas mixture of nitrogen with minor amounts of hydrogen and helium. The use of a combined nitrogen-hydrogen nitriding gas in the reaction bonding of $Si_3N_4$ is described by Shaw and Zeleznik in an article titled "Thermodynamics of Silicon Nitridation: Effect of Hydrogen", communications of the American Ceramic Society, November 1982, C180–C181 and the effect of temperature and nitrogen pressure on the kinetics of silicon nitridation along with the need for an activating agent such as iron is described by Atkinson, Moulson and Roberts in an article titled "Nitridation of High-Purity Silicon", Journal American Ceramic Society, Volume 59, No. 7–8, 285–289.

It has been the practice to nitride silicon powder by heating for long periods of time. An example of such is disclosed in U.S. Pat. No. 3,819,786, where a blend of silicon nitride powder and a binder mixture is heated in a stream of nitrogen from ambient to 1000° C. at 50° C./hr and then held under static nitrogen for 20 hours at 1350° C. and 10 hours at 1450° C. with a total nitriding time of more than thirty hours.

An example of a compound heating schedule for nitriding a mixture of silicon and silicon carbide powder is disclosed in U.S. Pat. No. 3,222,438, the disclosure of which is incorporated herein by reference, where the mixture is first compacted into a green compact and then heated in an atmosphere of nitrogen at a temperature of 1250° C. for 16 hours and then at 1450° C. for 3–4 hours where the first stage heating is conducted to pre-sinter the compound so that it doesn't melt at the 1450° C. temperature since the melting point of silicon is about 1420° C.

Reaction bonded silicon nitride is commonly prepared by reacting and nitriding the silicon (either as a powder or as a formed article) with nitrogen by exposing the silicon to a nitrogen-containing atmosphere at temperatures of 1100° C. to about 1420° C. for times sufficient to produce the silicon nitride. It is not uncommon for the nitriding time in prior art methods to about 100–200 hours. It is normal for a small amount of nitriding aid (e.g., iron oxide or nickel oxide) to be initially mixed with the silicon powder to enhance the nitridation of the silicon during the nitriding step.

U.S. Pat. No. 3,206,318 to Yamauchi et al. teaches a method of nitriding metallic silicon which lowers the ill effects of the oxidation of silicon nitride, in which the nitriding catalyst is (a) at least one primary substance selected from the group consisting of metallic vanadium, the inorganic compounds thereof, and mixtures thereof; or (b) that comprising (a) in which has been incorporated at least one secondary substance, selected from the group consisting of metallic cobalt, manganese, chromium, copper, nickel, iron, barium, and calcium and the inorganic compounds thereof. Yamauchi, et al. also teach a refractory article in which granular refractory material, such as alumina, is bonded with silicon nitride. The patent furthermore teaches that the oxides of the metals, Cu, Co, Ni, Cr, Mn and V, may likewise be used and that the quantity of these oxides is suitably 0.1–2 moles in terms of the metallic element to 100 moles of the silicon.

U.S. Pat. No. 4,235,857, METHOD OF NITRIDING SILICON, to Mangels teaches that silicon can be nitrided using a nitriding cycle over the temperature range of 900° C. to 1420° C. in an atmosphere consisting of a mixture of nitrogen, hydrogen and helium. However, the chemical composition of the nitriding gas is constantly changing due to the consumption of nitrogen during the nitridation of the silicon article, with the chemical activity of the nitrogen decreasing (partial pressure of nitrogen in the furnace decreases) as the temperature increases. The examples cited by Mangles have nitriding times of from 130 to 175 hours.

U.S. Pat. No. 4,351,787 to Martinengo et al. teaches that sintered silicon nitride articles can be prepared by forming a silicon powder mixture containing one or more sintering additives into a compact, the additives being present in the powder in an amount such as to ensure an additive content of from 0.5 to 20 wt % in the silicon nitride compact; heating the compact under a pure nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is from 0.1 to 44 microns in size and of high purity or containing only very small amounts of nitriding catalysts. The Martinengo et al. patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

It is, therefore, a primary object of the present invention to provide a method of enhancing the nitridation of silicon so that a more complete chemical conversion to silicon nitride may be achieved.

SUMMARY OF THE INVENTION

In accordance with the preferred embodiment of the invention, these and other objects and advantages are addressed as follows. A method of nitriding a silicon-containing material to form a silicon nitride material predominantly in the alpha phase is disclosed which includes (a) heating the silicon-containing material in an atmosphere containing at least hydrogen in the temperature range of from about 0° C. to about 800° C. and (b) thereafter nitriding the silicon-containing material by subjecting the silicon-containing material to a nitriding atmosphere at an elevated temperature to effect nitriding. Nitriding the silicon-containing material is preferably performed by heating the material in an atmosphere containing at least nitrogen in the temperature range of from about 1000° C. to about 1450° C.

DETAILED DESCRIPTION OF THE INVENTION

The processes of this invention generally include nitriding a silicon-containing material by (a) heating the silicon-containing material in an atmosphere containing at least hydrogen and (b) thereafter, nitriding the silicon-containing material by heating the material in a nitriding atmosphere in the temperature range of from about 1000° C. to about 1450° C. The silicon-containing material employed in this invention preferably includes silicon metal. The silicon-containing material may be in the form of powder or in a body formed by any method and may be processed by comminuting the silicon-containing material in water as taught by U.S. Pat. No. 4,943,401, which patent is hereby incorporated by reference. However, comminuting the silicon-containing material in water is not necessary to practice this invention. In step (a), the atmosphere containing at least hydrogen preferably contains at least about 1 mole percent hydrogen, more preferably, at least about 5 mole percent, even more preferably, at least about 25 mole percent and, most preferably, the atmosphere is 100 percent hydrogen.

Heating the silicon-containing material in the presence of hydrogen is performed in the temperature range of from about 0° C. to about 800° C., preferably, in the temperature range of from about 20° C. to about 800° C. Favorable results are achieved when the heating in the presence of hydrogen is performed from a minimum temperature of about 200° C. to a maximum temperature of from about 500° C. to about 800° C. Nitriding the silicon-containing material generally forms a silicon nitride material predominantly in the alpha phase. The nitriding atmosphere contains at least nitrogen gas which may be in combination with at least one other nitriding gas. The composition of the nitriding atmosphere is preferably kept substantially constant even though nitrogen is being consumed during the nitriding step by maintaining a substantially constant partial pressure of nitrogen gas during the nitriding. The nitriding atmosphere containing at least nitrogen gas may include: (1) substantially pure nitrogen gas; (2) nitrogen and helium gases; (3) nitrogen, helium and hydrogen gases; (4) nitrogen, helium, hydrogen, and water vapor or (5) nitrogen and hydrogen gases. The nitrogen is present from about 10 to about 100 mole percent, preferably, greater than about 80 mole percent and, more preferably, greater than about 90 mole percent. Helium may be present from about 10 to 90 mole percent, hydrogen present from about 1 to about 10 mole percent, and the water vapor from about 0 to about 5 mole percent. The nitrogen atmosphere may be a combination of these mole percentages of the above-described gas constituents.

The nitriding step is favorably performed while heating at an increasing temperature rate of from about 5° C.–50° C. per hour until an elevated temperature of about 1350° C. to about 1450° C. is reached. The nitriding step preferably begins at about 1000° C. with an increasing temperature rate of about 5° C. to about 50° C., more preferably at the rate of 15–25° C. per hour. The increasing temperature rate during nitriding is preferably substantially linear but may be nonlinear. The nitriding step is held between about 1350° C. to about 1450° C. for less than 2 hours once these temperatures have been achieved. Furthermore, the nitriding is preferably accomplished with a system pressure of from about a ½ atmosphere absolute up to about 2 atmospheres absolute.

During this heating and nitriding cycle, nitrogen is consumed by the silicon to form silicon nitride. The nitriding gas composition in the furnace atmosphere is favorable kept constant by admitting substantially pure nitrogen gas into the furnace to maintain the slightly greater than atmospheric pressure. Once the upper temperature is reached, the upper temperature bias from about 1350° C. to about 1450° C., preferably 1420° C., that temperature is preferably maintained for less than about 1 hour and the heat source is shut off and the silicon nitride powder or articles are allowed to cool. Processed powder and compacted articles may be manufactured utilizing the above described processes. However, the greatest improvement in conversion to silicon nitride is experienced with pieces of silicon-containing material which have a minimum thickness of ½". Even greater improvements is experienced with pieces which have a minimum thickness of 1". Samples prepared by this method display excellent properties, low size distortion high material integrity and high conversion to silicon nitride.

In one embodiment of the present invention, a process for nitriding materials containing silicon which has been comminuted with water is disclosed, the comminuting being performed to enhance and allow substantial chemical reaction between the silicon and the water. Binders may also be employed with the silicon-containing materials to bind the silicon-containing particles together to enhance their being formed into parts. Examples of such binders include a mixture of butyl methacrylate and trichlorethylene disclosed in U.S. Pat. No. 3,819,786 in conjunction with silicon nitride powder and a blend of polyvinyl alcohol and water and a silicon carbide and beryllium oxide blend disclosed in U.S. Pat. No. 3,205,080. The use of binders common to the ceramics industry produces compacts with sufficient strength to allow machining without the need for special heat treatments which partially nitride or sinter the silicon compact. It is believed that a silicon nitride material is formed which is predominantly in the alpha-phase. The method includes heating the water comminuted silicon-containing material to about 800° C. in an atmosphere containing substantially pure hydrogen to form silicon-containing material enhanced for nitridation. The enhanced silicon-containing material is then nitrided by subjecting it to a nitriding atmosphere containing about 40 to about 60 mole percent nitrogen, from about 40 to about 60 mole percent helium, and from about 1 to about 4 mole percent hydrogen. Preferably, the nitriding begins at about 1000° C. and occurs with a substantially linear upwardly increasing temperature rate of from about 5° C. to about 50° C. per hour to an elevated temperature of between about 1350° C. to about 1450° C. at a system pressure of from about one half to about two atmospheres absolute. The composition of the gas constituents of the nitriding atmosphere is maintained with a substantially constant partial pressure of nitrogen gas during the nitriding. Another process for nitriding materials containing silicon further may include the addition of up to about five percent water vapor in the nitriding atmosphere. This mode is useful with silicon-containing materials which have been drymilled or otherwise processed such that they do not contain the water-silicon product.

Thus, there is provided in accordance with the present invention, a method for enhancing the nitridation of a silicon-containing material so that a higher conversion to silicon nitride is achieved.

The following examples are illustrative only, and should not be construed as limiting the invention which is properly delineated in the appended claims.

EXAMPLE 1

Added together in a ball mill are: (1) 100 pounds commercial grade silicon metal powder ground to approximately 2.3 F.A.D. (Fisher Average Diameter) or finer, which is substantially less than 20 micron size; (2) 3 pounds micron size iron oxide $Fe_2O_3$; (3) 68 pounds distilled water; and (4) 50 grams of dispersing aid, Darvan No. 1, a registered trademark of the R.T. Vanderbilt company, Inc. This slurry mixture is comminuted for 3 hours while venting the evolving gases (hydrogen and water vapor) every hour. Organic binders in conjunction with normal plasticizers and viscosity modifiers, if employed, are preferably added to the ball mill approximately one hour before pumping the slip out of the mill. Then 1½ pounds polyvinylalcohol (available from Air Products, Inc., Allentown, Pa), ½ pound polyethylene glycol (CARBOWAX 1000 available from Union Carbide Corporation, New York, N.Y.), ¼ pound xanthan gum (KELZAN, available from Kelco, a division of Merck & Co., Inc., Rahway, N.J.), and 1 pound food grade glycerol are added to the slurry in the ball mill and comminution is continued for about 1 hour. These organic additives have an added advantage in that they are all food grade materials, thus posing greatly reduced toxicity problems over prior art methods.

After ball milling, the slurry is pumped into a holding tank, covered loosely to allow evolving gases to escape, and aged overnight to allow the majority of the reaction between the silicon and the water to occur. The reaction is evidenced by substantial frothing which is reduced by morning.

The reacted slurry is transferred into a circulating tank and continuously circulated to keep the viscosity low by shearing, thereby keeping the slurry from gelling due to the presence of the xanthan gum.

The slurry is then pumped into a spray dryer, and spray-dried. The collected spray-dried granules are screen-separated into three distinct particle size ranges. The particles that are greater than 30 mesh in size are set aside for recycling. The fine particles of less than 200 mesh are isopressed in an isopress machine to produce billets. The spray-dried granules of a size between 30 and 200 mesh are put into a dry press and pressed into green body parts. Due to the addition of the organic materials, the green body parts are easily machinable after isopressing or dry pressing without having to pre-sinter or pre-nitride to add strength to the silicon body. The pressed parts are then racked on saggers and put into a furnace.

The furnace is evacuated to −100 KPa and then filled with pure hydrogen gas. The temperature of the furnace is then increased from room temperature to 800° C. over a two hour period by a nearly linear progression of increasing temperature while flowing hydrogen through the furnace at atmospheric pressure to burn off the organic materials and enhance the silicon metal for subsequent nitridation. The substantially non-toxic effluent which is vented includes carbon dioxide and water.

At 800° C. the furnace is purged with flowing nitrogen to obtain a noncombustible atmosphere and then evacuated again to remove the nitrogen and any remaining effluent. Helium gas is added until a pressure of 50 KPa absolute is indicated. Then a nitrogen-hydrogen gas blend consisting of 4 weight percent hydrogen and 96 weight percent nitrogen is admitted to the furnace until the pressure is slightly above atmospheric pressure (approximately 120 KPa absolute) to avoid any leakage of ambient air into the furnace. The resulting composition of the nitriding gas constituents nitrogen, helium and hydrogen in the nitriding gas are 48%, 50% and 2%, respectively. No water vapor is required in the nitriding gas in this procedure because the silicon was initially comminuted with water and substantial reaction was allowed to occur. During this process, the temperature of the furnace is increased from 800° C. to 1000° C.

The temperature is then preferably increased from 1000° C. to about 1420° C. at a linear rate of about 20° C. per hour. During this heating cycle, nitrogen is consumed by the silicon to form silicon nitride. The nitriding gas composition in the furnace atmosphere is kept constant by admitting pure nitrogen gas into the furnace as nitrogen is consumed during the conversion of the silicon to maintain a constant nitrogen partial pressure. Once 1420° C. is reached, the temperature is maintained for 1 hour; then the heat source is shut off and the silicon nitride articles are allowed to cool. Samples prepared by this method display excellent properties, low size distortion and high material integrity.

Test bars of the reaction bonded silicon nitride may be made having dimensions of 0.100×0.320×2.25 inches. In four-point modulus of rupture tests of such bars using conditions consisting of a lower span of 1.75 inches and an upper span of 0.60 inches with a loading rate of 0.02 inches/minute, typical values for the density, the average four-point modulus of rupture (MOR), and the range of MOR strengths are provided in Table 1.

TABLE 1

| Density | 4-Point MOR | 4-Point MOR |
|---|---|---|
| (gm/cc) | Averages (Kpsi*) | Range (Kpsi) |
| 2.8–2.9 | 31–36 | 27–42 |

*Kpsi = Thousands of pounds per sguare inch.

EXAMPLE 2

In this experiment a series of six (6) rectangular billets measuring approximately 1 inch by 1 inch by slightly more than 4 inches in length were fabricated by isopressing, at 20,000 psi, using a spray-dried silicon metal powder mix suitable for later nitridation to silicon nitride, and densification by sintering. The silicon metal powder mix was prepared by comminuting 100 pounds of silicon metal powder obtained from Globe Metallurgical, specified as a size of 2.03 F.A.D.; 3 pounds of Pfizer red iron oxide, grade R2199; 1 pound of R. T. Vanderbilt Darvan No. 6 dispersant, 20 pounds of cerium oxide, Molycorp grade 5310, 4 pounds of aluminum oxide, Alcoa grade SG16, and approximately eight gallons of distilled water for 3 hours in an aluminalined ball mill, using approximately 1-inch diameter alumina media. At the end of the 3 hours of milling, 3 pounds of an organic mix consisting of 1½ pounds of polyvinyl alcohol, Air Products grade Vinol 205S; 1 pound of food-grade glycerol; ½ pound of polyethylene glycol, Union Carbide Carbowax grade 1000; ¼ pound Kelco Kelzan xanthan gum; and approximately 1 additional gallon of distilled water were added to the ball mill containing the comminuted silicon metal mixture. The silicon metal-organics mixture was further comminuted for approximately one hour, whence it was discharged from the mill into a holding tank and allowed to age overnight. The slurry was then spray dried to a free flowing powder suitable for isopressing into billets.

The six billets, isopressed at 20,000 psi from the aforementioned spray-dried powder, were each weighed and measured to determine their green weight and dimensions prior to placement into a furnace. Each billet was processed in a separate furnace run so that the effects of a pre-nitridation treatment with hydrogen gas could be evaluated. Each billet was placed in a furnace which was evacuated and filled with an atmosphere having a composition consisting of nitrogen with varying amounts of hydrogen as is shown in Table 2 in the pre-nitridation column. The temperature of the furnace was then raised from room temperature to 1000° C. using a linear rate of temperature increase over a two hour period. Between 900° C. and 1000° C. the furnace was evacuated in preparation for the nitriding gas. At 1000° C. the nitriding atmosphere was introduced into the evacuated furnace. The composition of the nitriding atmosphere is also shown in Table 2. The temperature of the furnace was then increased linearly to 1450° C. at a rate of approximately 15° C. per hour. The power to the furnace was then turned off, and the furnace was allowed to cool wherein the nitrided billet was removed, weighed, and measured to determine its nitrided weight and dimensions. The ratio of the nitrided weight of the billet to the green weight of the billet is reported as the R-Factor in Table 2. The R-Factor is directly related to the amount of chemical conversion of the silicon metal in the billet to silicon nitride ceramic. The higher the R-Factor, the greater the amount of conversion of silicon metal to silicon nitride ceramic resulting from the nitridation.

TABLE 2

| Run No. | Pre-Nitridation Atmosphere Composition* ($H_2/N_2$) | Nitridation Atmosphere Composition* ($N_2/He/H_2$) | R-Factor |
|---|---|---|---|
| 1104 | 100/0 | 70/50/5 | 1.41 |
| 1113 | 50/50 | 70/50/5 | 1.35 |
| 1115 | 25/75 | 70/50/5 | 1.36 |
| 1122 | 0/100 | 70/50/5 | 1.22 |
| 1125 | 100/0 | 125/0/0 | 1.43 |
| 1211 | 100/0 | 120/0/5 | 1.41 |

*Atmosphere composition ratios are expressed in partial pressures, measured in KPa As Table 2 shows, the amount of hydrogen in the pre-nitridation atmosphere affects the amount of silicon nitride ceramic formed during nitridation of the approximately 1 inch by 1 inch by 4 inch isopressed billets. High hydrogen concentrations in the pre-nitridation atmosphere result in significantly higher R-Factors demonstrating higher conversion of the silicon metal to silicon nitride ceramic. Also shown in Table 2 is the fact that the use of pure hydrogen gas for pre-nitridation in combination with a pure nitrogen or an atmosphere of nitrogen with a small amount of hydrogen for the nitriding gas produces the greatest amount of conversion of silicon metal to silicon nitride ceramic.

EXAMPLE 3

For this example a spray-dried silicon metal powder mix similar to the one used in Example 2 was isopressed at 20,000 psi into billets and machined into three sizes of cylinders, the cylinders measuring approximately ½ inch, 1 inch, and 2 inches in diameter. The height of each cylinder was approximately equal to its diameter. Three cylinders, one of each size were processed together in each furnace run using the method of Example 2. Table 3 contains the details of the pre-nitridation and nitridation atmosphere compositions, the rate of nitridation, and the calculated R-Factor explained in Example 2. The first set of three runs listed used cylinders having a ½ inch diameter. The second set of three runs listed used cylinders having a 1 inch diameter. The third set of three runs listed used cylinders having a 2 inch diameter. As can be seen from the data of Table 3, for cylindrical bodies above ½ inch in diameter, the hydrogen pre-nitridation treatment in combination with a high nitrogen concentration in the nitridation atmosphere results in significantly higher R-Factors demonstrating higher chemical conversion of the silicon metal into silicon nitride ceramic.

TABLE 3

| Run No. | Pre-Nitriding Atmosphere Composition* ($H_2/N_2$) | Nitriding Atmosphere Composition* ($N_2/He/H_2$) | Nitriding Rate (° C./hr) | R-Factor |
|---|---|---|---|---|
| 1204 | 100/0 | 80/50/5 | 15 | 1.40 |
| 1213 | 100/0 | 120/0/5 | 15 | 1.43 |
| 1216 | 100/0 | 120/0/5 | 7 | 1.43 |
| 1204 | 100/0 | 80/50/5 | 15 | 1.31 |
| 1213 | 100/0 | 120/0/5 | 15 | 1.40 |
| 1216 | 100/0 | 120/0/5 | 7 | 1.40 |
| 1204 | 100/0 | 80/50/5 | 15 | 1.19 |
| 1213 | 100/0 | 120/0/5 | 15 | 1.31 |
| 1216 | 100/0 | 120/0/5 | 7 | 1.34 |

*Atmosphere composition ratios are expressed in partial pressures, measured in KPa While my invention has been described in terms of preferred embodiments, it will be appreciated that other forms could readily be adapted by one skilled in the art. Accordingly, the scope of my invention is to be considered limited only by the following claims.

What is claimed is:

1. A process for nitriding a silicon-containing material, comprising:
    (a) first heating the silicon-containing material in an atmosphere containing at least about 25 mole percent hydrogen in a first temperature range from about 200° C. to about 800° C. and
    (b) thereafter, separately nitriding the silicon-containing material by subjecting the silicon-containing material to a nitriding atmosphere in a second temperature range from about 1000° C. to about 1450° C. to effect nitriding, said nitriding atmosphere containing at least nitrogen gas.

2. The process of claim 1, wherein the first atmosphere containing at least hydrogen contains 100 percent hydrogen.

3. A process for nitriding a silicon-containing material, comprising:
    admixing an organic binder with the silicon-containing material;

pressing the silicon-containing material-organic binder admix into a green body part, the organic binder being admixed at a level which provides the green body part with sufficient strength to allow machining without the need for partially nitriding or sintering the green body part;

first heating the silicon-containing material in an atmosphere containing at least about 25 mole percent hydrogen in a first temperature range of from about 200° C. to about 800° C.; and thereafter separately nitriding the silicon-containing material by subjecting the silicon-containing material to a nitriding atmosphere in a second temperature range of from about 1000° C. to about 1450° C. to effect nitriding, said nitriding atmosphere containing at least nitrogen gas.

4. The process of claim 1, wherein the silicon-containing material is in powder form during both the first heating in an atmosphere containing at least hydrogen step and the separate nitriding step.

5. A process for nitriding a silicon-containing material, comprising:
  (a) first heating the silicon-containing material without sintering the silicon-containing material in an atmosphere containing at least 25 mole percent hydrogen in a first temperature range of from about 200° C. to about 800° C.; and
  (b) thereafter, separately heating from the first temperature range to a second temperature range of from about 1000° C. to about 1450° C. and nitriding the silicon-containing material by subjecting the silicon-containing material to a nitriding atmosphere while heating to the second temperature range to effect nitriding, said nitriding atmosphere containing at least nitrogen gas.

6. The process of claim 5, wherein the first atmosphere containing at least 25 mole percent hydrogen contains 100 percent hydrogen.

7. The process of claim 5, further comprising, prior to heating the silicon-containing material in a first atmosphere containing at least 25 mole percent hydrogen, the steps of:
  (a) admixing an organic binder with the silicon-containing material; and
  (b) pressing the silicon-containing material-organic binder admix into a green body part, the organic binder being admixed at a level which provides the green body part with sufficient strength to allow machining without the need for partially nitriding or sintering the green body part.

8. The process of claim 5, wherein the silicon-containing material is in powder form during both the first heating in a hydrogen-containing atmosphere and the separate nitriding steps.

9. A process for nitriding a silicon-containing material, consisting essentially of the steps of:
  (a) first heating the silicon-containing material in an atmosphere containing at least hydrogen in a first temperature range of from about 0° C. to about 800° C.; and
  (b) thereafter, separately nitriding the silicon-containing material by heating in an atmosphere containing at least nitrogen in a second temperature range of from about 1000° C. to about 1450° C.

10. The process of claim 9, wherein the first temperature range is from about 200° C. to about 800° C.

11. The process of claim 9, wherein the atmosphere containing at least hydrogen contains at least about 25 mole percent hydrogen.

12. The process of claim 9, wherein the atmosphere containing at least hydrogen contains 100 percent hydrogen.

13. The process of claim 9, wherein the silicon-containing material is in powder form during both the heating in an atmosphere containing at least hydrogen step and the separate nitriding step.

14. A process for nitriding a silicon-containing material, consisting essentially of the steps of:
  (a) admixing an organic binder with the silicon-containing material;
  (b) pressing the silicon-containing material-organic binder admix into a green body part, the organic binder being admixed at a level which provides the green body part with sufficient strength to allow machining without the need for partially nitriding or sintering the green body part;
  (c) first heating the green body part in an atmosphere containing at least hydrogen in a first temperature range of from about 0° C. to about 800° C.; and
  (d) thereafter, separately nitriding the green body part by heating in an atmosphere containing at least nitrogen in a second temperature range of from about 1000° C. to about 1450° C.

* * * * *